(12) United States Patent
Suthar et al.

(10) Patent No.: US 10,773,191 B2
(45) Date of Patent: Sep. 15, 2020

(54) FILTER ASSEMBLY

(71) Applicant: Haier US Appliance Solutions, Inc., Wilmington, DE (US)

(72) Inventors: Naresh Suthar, Hyderabad (IN); Sharath Chandra S, Hyderabad (IN); Sasikumar Madanagopal, Hyderabad (IN); Pampana Vamsi Krishna, Hyderabad (IN); Anirban Roy, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 386 days.

(21) Appl. No.: 15/667,008

(22) Filed: Aug. 2, 2017

(65) Prior Publication Data

US 2019/0039005 A1     Feb. 7, 2019

(51) Int. Cl.
  *B01D 35/153* (2006.01)
  *B01D 35/30* (2006.01)
  *C02F 1/28* (2006.01)
  *C02F 1/44* (2006.01)
  *C02F 1/00* (2006.01)

(52) U.S. Cl.
  CPC ......... *B01D 35/306* (2013.01); *B01D 35/153* (2013.01); *B01D 2201/302* (2013.01); *B01D 2201/305* (2013.01); *B01D 2201/306* (2013.01); *B01D 2201/4023* (2013.01); *B67D 2210/0001* (2013.01); *C02F 1/003* (2013.01); *C02F 1/281* (2013.01); *C02F 1/283* (2013.01); *C02F 1/285* (2013.01); *C02F 1/441* (2013.01); *C02F 2201/006* (2013.01); *C02F 2307/12* (2013.01); *F25D 2323/121* (2013.01)

(58) Field of Classification Search
  CPC .. B01D 35/153; B01D 35/157; B01D 35/306; B01D 2201/306; B01D 2201/305; B01D 2201/302; B01D 2201/4023; C02F 1/281; C02F 1/283; C02F 1/441; C02F 1/003; C02F 1/285; C02F 2307/12; C02F 2201/006; F67D 2201/0001; F25D 2323/121
  USPC .................................................. 210/234–235
  See application file for complete search history.

(56) References Cited

U.S. PATENT DOCUMENTS

| | | | |
|---|---|---|---|
| 3,715,032 A * | 2/1973 | Nicko | B01D 35/147 210/133 |
| 5,744,030 A | 4/1998 | Reid et al. | |
| 7,435,347 B2 * | 10/2008 | Klein | B01D 35/143 210/234 |

(Continued)

FOREIGN PATENT DOCUMENTS

| | | |
|---|---|---|
| KR | 100668767 B1 | 1/2007 |
| WO | WO2015/167248 A1 | 11/2015 |

*Primary Examiner* — Thomas M Lithgow
(74) *Attorney, Agent, or Firm* — Dority & Manning, P.A.

(57) ABSTRACT

A filter manifold includes a housing and a shuttle. The shuttle is disposed within the housing such that the shuttle is movable relative to the housing between a plug position and a flow position along an axial direction. The shuttle is also coupled to the housing such that the shuttle is non-rotatable relative to the housing about the axial direction. A spring is disposed within the housing. The spring is connected to the shuttle such that the tension spring urges the shuttle towards the plug position. The shuttle is positioned at the flow position of the shuttle when a filter cartridge is coupled to the filter manifold.

16 Claims, 14 Drawing Sheets

(56) References Cited

U.S. PATENT DOCUMENTS

| | | | |
|---|---|---|---|
| 8,398,853 B2* | 3/2013 | An | B01D 35/147 137/594 |
| 8,627,675 B2* | 1/2014 | Kruckenberg | B23P 19/04 62/318 |
| 8,955,349 B2* | 2/2015 | Mitchell | B01D 35/02 62/318 |
| 9,370,737 B1 | 6/2016 | Nuss et al. | |
| 2011/0139698 A1 | 6/2011 | Freystedt et al. | |

\* cited by examiner

FILTER ASSEMBLY

FIELD OF THE INVENTION

The present subject matter relates generally to filter assemblies, such as filter assemblies for refrigerator appliances.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In order to filter water, water filters are generally provided with a filtering media, such as a block of activated carbon. The water filter's filtering media can adsorb or remove contaminants such as chlorine and lead from water prior to delivering such water to a user. For example, the water filter can filter water prior to such water entering the refrigerator's ice maker or water dispenser.

The block of activated carbon has pores that permit a flow of water through the block. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. However, the filtering capacity of the filtering media can decrease over time due to pores becoming clogged or pore surfaces become saturated with contaminates. Also, conditions within the filtering media can provide for large scale bacteria growth, particularly over time. For example, bacteria can start to grow within the carbon block given the right water conditions and sufficient time.

To hinder such bacteria growth and insure that the filtering media has not exceeded its filtering capacity, the water filter is preferably replaced or serviced about every six months regardless of its current performance. However, changing the water filter can be a messy and time consuming task. For example, when a filter cartridge is removed from a manifold water can spill from the manifold. To limit spilling, water flow to the manifold can be terminated with a valve, but actuating a valve can be time consuming and inconvenient. Thus, certain consumers only replace the water filter after it has become blocked, e.g., by sediment accumulation around and within the carbon block.

Accordingly, a water filter with features for hindering spilling of water during removal or replacement of a filter cartridge would be useful.

BRIEF DESCRIPTION OF THE INVENTION

The present subject matter provides a filter manifold with a housing and a shuttle. The shuttle is disposed within the housing such that the shuttle is movable relative to the housing between a plug position and a flow position along an axial direction. The shuttle is also coupled to the housing such that the shuttle is non-rotatable relative to the housing about the axial direction. A spring is disposed within the housing. The spring is connected to the shuttle such that the tension spring urges the shuttle towards the plug position. The shuttle is positioned at the flow position of the shuttle when a filter cartridge is coupled to the filter manifold. Additional aspects and advantages of the invention will be set forth in part in the following description, or may be apparent from the description, or may be learned through practice of the invention.

In a first example embodiment, a filter manifold is provided. The filter manifold includes a housing having an inlet passage and an outlet passage. The housing defines a slot between a pair of support walls of the housing. A shuttle is disposed within the housing such that the shuttle is movable relative to the housing between a plug position and a flow position along an axial direction. The shuttle has an inlet passage and an outlet passage. The inlet passage of the shuttle is contiguous with the inlet passage of the housing in the flow position of the shuttle, and the outlet passage of the shuttle is contiguous with the outlet passage of the housing in the flow position of the shuttle. The inlet passage of the shuttle is non-contiguous with the inlet passage of the housing in the plug position of the shuttle, and the outlet passage of the shuttle is non-contiguous with the outlet passage of the housing in the plug position of the shuttle. The shuttle is coupled to the housing such that the shuttle is non-rotatable relative to the housing about the axial direction. A tension spring is disposed within the housing. The tension spring is connected to the shuttle such that the tension spring urges the shuttle towards the plug position. The shuttle is positioned at the flow position of the shuttle when a filter cartridge is coupled to the filter manifold. The slot of the housing is sized for receiving a pair of lugs of the filter cartridge during mounting of the filter cartridge to the filter manifold. The pair of support walls of the housing is positioned for supporting the pair of lugs of the filter cartridge when the filter cartridge is coupled to the filter manifold.

In a second example embodiment, a filter manifold is provided. The filter manifold includes a housing having an inlet passage and an outlet passage. A shuttle is disposed within the housing such that the shuttle is movable relative to the housing between a plug position and a flow position along an axial direction. The shuttle has an inlet passage and an outlet passage. The inlet passage of the shuttle is contiguous with the inlet passage of the housing in the flow position of the shuttle, and the outlet passage of the shuttle is contiguous with the outlet passage of the housing in the flow position of the shuttle. The inlet passage of the shuttle is non-contiguous with the inlet passage of the housing in the plug position of the shuttle, and the outlet passage of the shuttle is non-contiguous with the outlet passage of the housing in the plug position of the shuttle. The shuttle is coupled to the housing such that the shuttle is non-rotatable relative to the housing about the axial direction. A spring is disposed within the housing. The spring is connected to the shuttle such that the spring urges the shuttle towards the plug position. A filter cartridge sleeve is mounted to the housing. The filter cartridge sleeve is configured for receiving a filter cartridge. The filter cartridge sleeve has a door. When the door is in a closed position, the filter cartridge couples with the filter manifold such that the shuttle is positioned at the flow position of the shuttle.

In a third example embodiment, a filter assembly is provided. The filter assembly includes a filter cartridge having a pair of lugs. A filter manifold includes a housing having an inlet passage and an outlet passage. The housing defines a slot between a pair of support walls of the housing. A shuttle is disposed within the housing such that the shuttle is movable relative to the housing between a plug position and a flow position along an axial direction. The shuttle has an inlet passage and an outlet passage. The inlet passage of the shuttle is contiguous with the inlet passage of the housing in the flow position of the shuttle, and the outlet passage of the shuttle is contiguous with the outlet passage of the housing in the flow position of the shuttle. The inlet passage of the shuttle is non-contiguous with the inlet passage of the housing in the plug position of the shuttle, and the outlet passage of the shuttle is non-contiguous with the outlet passage of the housing in the plug position of the shuttle. The shuttle is coupled to the housing such that the shuttle is non-rotatable relative to the housing about the axial direction. A seal extends between the housing and the shuttle. A tension spring is disposed within the housing. The tension spring is connected to the shuttle such that the tension spring urges the shuttle towards the plug position. The shuttle is positioned at the flow position of the shuttle when the filter cartridge is coupled to the filter manifold. The slot of the housing is sized for receiving the pair of lugs of the filter cartridge during mounting of the filter cartridge to the filter manifold. The pair of support walls of the housing is positioned for supporting the pair of lugs of the filter cartridge when the filter cartridge is coupled to the filter manifold.

In a fourth example embodiment, a filter assembly is provided. The filter assembly includes a filter cartridge and a filter manifold. The filter manifold includes a housing having an inlet passage and an outlet passage. A shuttle is disposed within the housing such that the shuttle is movable relative to the housing between a plug position and a flow position along an axial direction. The shuttle has an inlet passage and an outlet passage. The inlet passage of the shuttle is contiguous with the inlet passage of the housing in the flow position of the shuttle, and the outlet passage of the shuttle is contiguous with the outlet passage of the housing in the flow position of the shuttle. The inlet passage of the shuttle is non-contiguous with the inlet passage of the housing in the plug position of the shuttle, and the outlet passage of the shuttle is non-contiguous with the outlet passage of the housing in the plug position of the shuttle. The shuttle is coupled to the housing such that the shuttle is non-rotatable relative to the housing about the axial direction. A seal extends between the housing and the shuttle. A spring is disposed within the housing. The spring is connected to the shuttle such that the spring urges the shuttle towards the plug position. A filter cartridge sleeve is mounted to the housing. The filter cartridge sleeve is configured for receiving the filter cartridge. The filter cartridge sleeve has a door. When the door is in a closed position, the filter cartridge couples with the filter manifold such that the shuttle is positioned at the flow position of the shuttle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
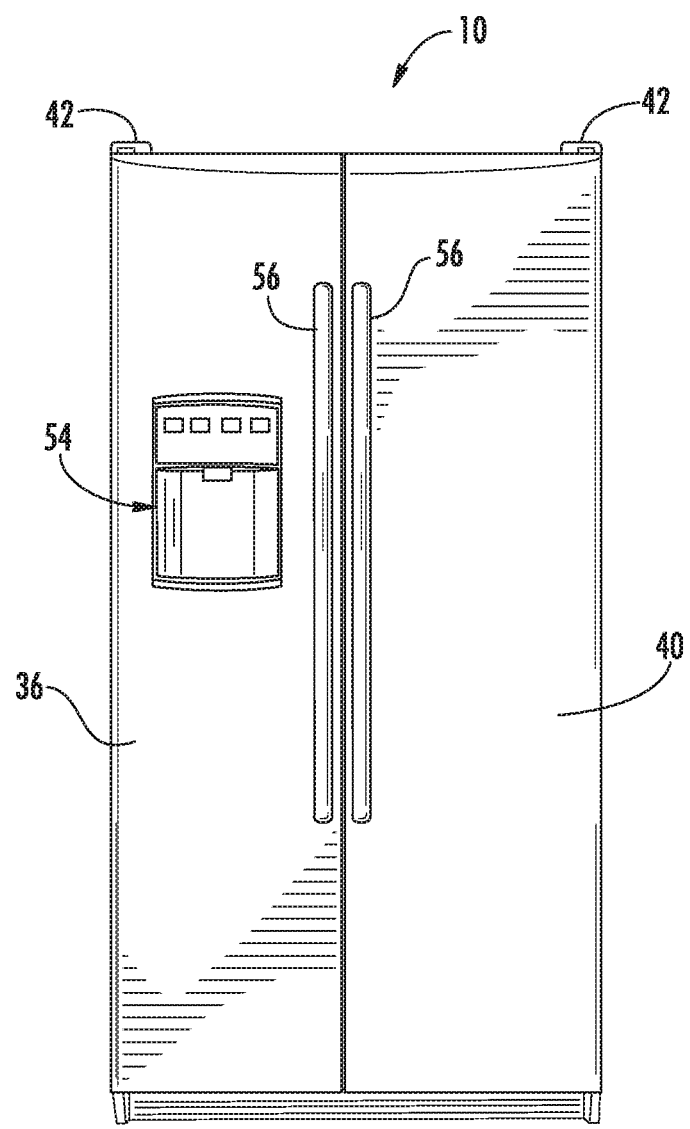
FIG. 1 provides a perspective view of a refrigerator appliance according to an example embodiment of the present subject matter with doors of the example refrigerator appliance shown closed.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a refrigeration appliance 10 according to an exemplary embodiment of the present subject matter. Refrigerator appliance 10 may include a filter assembly 60 that includes features for facilitating maintenance and/or servicing of filter assembly 60. It should be appreciated that refrigerator appliance 10 is provided for illustrative purposes only and that the present subject matter is not limited to any particular type, style, or configuration of refrigeration appliance, and may be used in or with any manner of refrigerator, freezer, refrigerator/freezer combination, and so forth.

Figure 2:
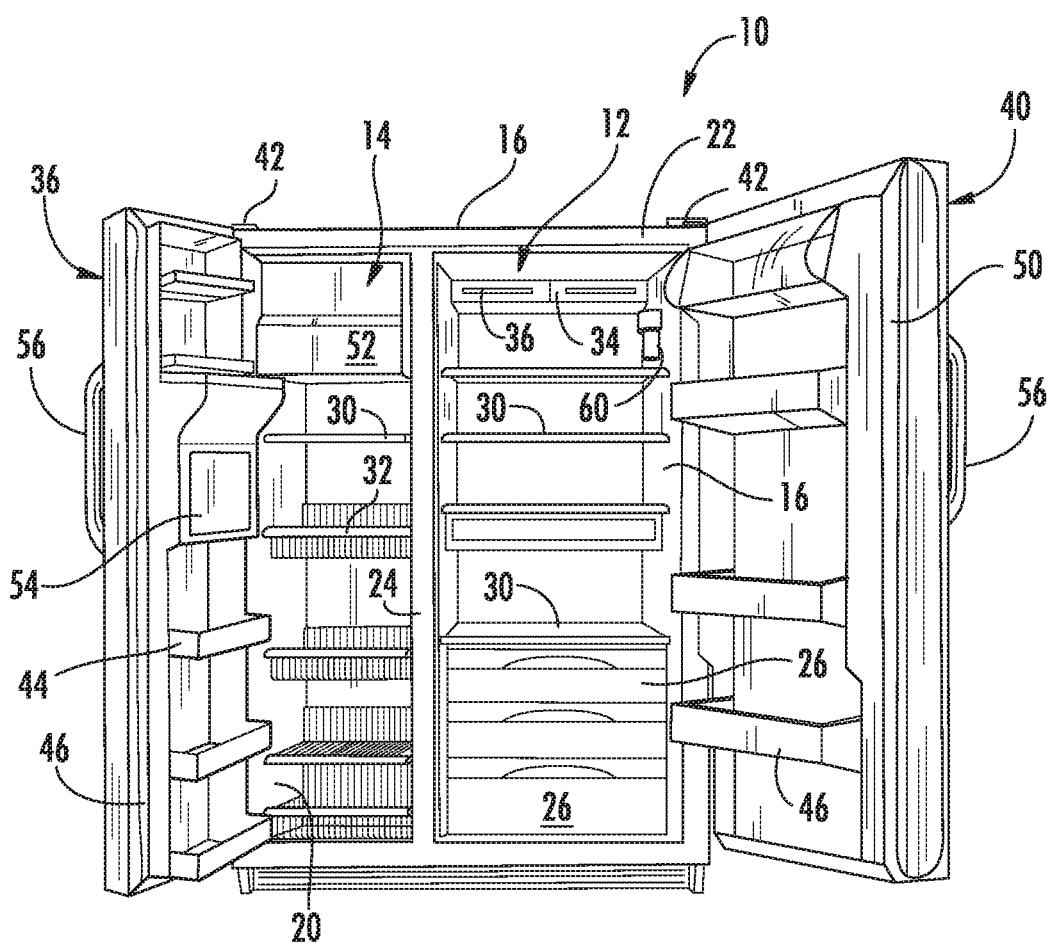
FIG. 2 is a perspective view of the example refrigerator appliance with doors of the example refrigerator appliance shown open.

Referring to FIG. 2, refrigerator appliance 10 includes a fresh food storage compartment 12 and a freezer storage compartment 14, with the compartments arranged side-by-side and contained within an outer case 16 and inner liners 18 and 20 generally molded from a suitable plastic material. Thus, refrigerator appliance 10 is generally referred to as a side-by-side style refrigerator appliance. In alternative exemplary embodiments, refrigerator appliance 10 may include a single liner and a mullion that spans between opposite sides of the single liner to divide it into freezer storage compartment 14 and fresh food storage compartment 12. Outer case 16 is normally formed by folding a sheet of a suitable material, such as pre-painted steel, into an inverted U-shape to form top and side walls of outer case 16. A bottom wall of outer case 16 normally is formed separately and attached to the case side walls and to a bottom frame that provides support for refrigerator appliance 10.

A breaker strip 22 extends between a case front flange and outer front edges of inner liners 18 and 20. Breaker strip 22 is formed from a suitable resilient material, such as an extruded acrylo-butadiene-styrene based material (commonly referred to as ABS). The insulation in the space between inner liners 18 and 20 is covered by another strip of suitable resilient material, which also commonly is referred to as a mullion 24 and may be formed of an extruded ABS material. Breaker strip 22 and mullion 24 form a front face, and extend completely around inner peripheral edges of outer case 16 and vertically between inner liners 18 and 20.

Slide-out drawers 26, a storage bin 28 and shelves 30 are normally provided in fresh food storage compartment 12 to support items being stored therein. In addition, at least one shelf 30 and at least one wire basket 32 are also provided in freezer storage compartment 14.

Refrigerator appliance features are regulated with a controller 34 according to user preference via manipulation of a control interface 36 mounted in an upper region of fresh food storage compartment 12 and coupled to controller 34. As used herein, the term "controller" is not limited to just those integrated circuits referred to in the art as microprocessor, but broadly refers to computers, processors, microcontrollers, microcomputers, programmable logic controllers, application specific integrated circuits, and other programmable circuits, and these terms are used interchangeably herein.

A freezer door 38 and a fresh food door 40 close access openings to freezer storage compartment 14 and fresh food storage compartment 12. Freezer door and fresh food door 38 and 40 are each mounted by a top hinge 42 and a bottom hinge (not shown) to rotate about its outer vertical edge between an open position, as shown in FIG. 1, and a closed position. Freezer door 38 may include a plurality of storage shelves 44 and a sealing gasket 46, and fresh food door 40 also includes a plurality of storage shelves 48 and a sealing gasket 50.

Freezer storage compartment 14 may include an automatic ice maker 52 and a dispenser 54 provided in freezer door 38 such that ice and/or chilled water can be dispensed without opening freezer door 38, as is well known in the art. Freezer door and fresh food door 38 and 40 may be opened by handles 56.

Refrigerator appliance 10 also includes filter assembly 60 for filtering water coming into refrigerator appliance 10 from a water supply (not shown), such as a municipal water source or a well. Filter assembly 60 can remove contaminants such as chlorine, chloroform, lead, arsenic, pharmaceuticals, microbes, and/or other undesirable substances from water supplied to refrigerator appliance 10. In particular, filter assembly 60 can supply filtered water to ice maker 52 and/or dispenser 54. As will be understood and used herein, the term "water" includes purified water and solutions or mixtures containing water and, e.g., elements (such as calcium, chlorine, and fluorine), salts, bacteria, nitrates, organics, and other chemical compounds or substances.

As with known refrigerators, refrigerator appliance 10 also includes a machinery compartment (not shown) that at least partially contains components for executing a known vapor compression cycle for cooling air. The components include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to direct cool the ice maker to form ice cubes, and a heating loop can be added to help remove ice from the ice maker. Collectively, the vapor compression cycle components in a refrigeration circuit, associated fans, and associated compartments are conventionally referred to as a sealed system. The construction and operation of the sealed system are well known to those skilled in the art.

Figure 3:
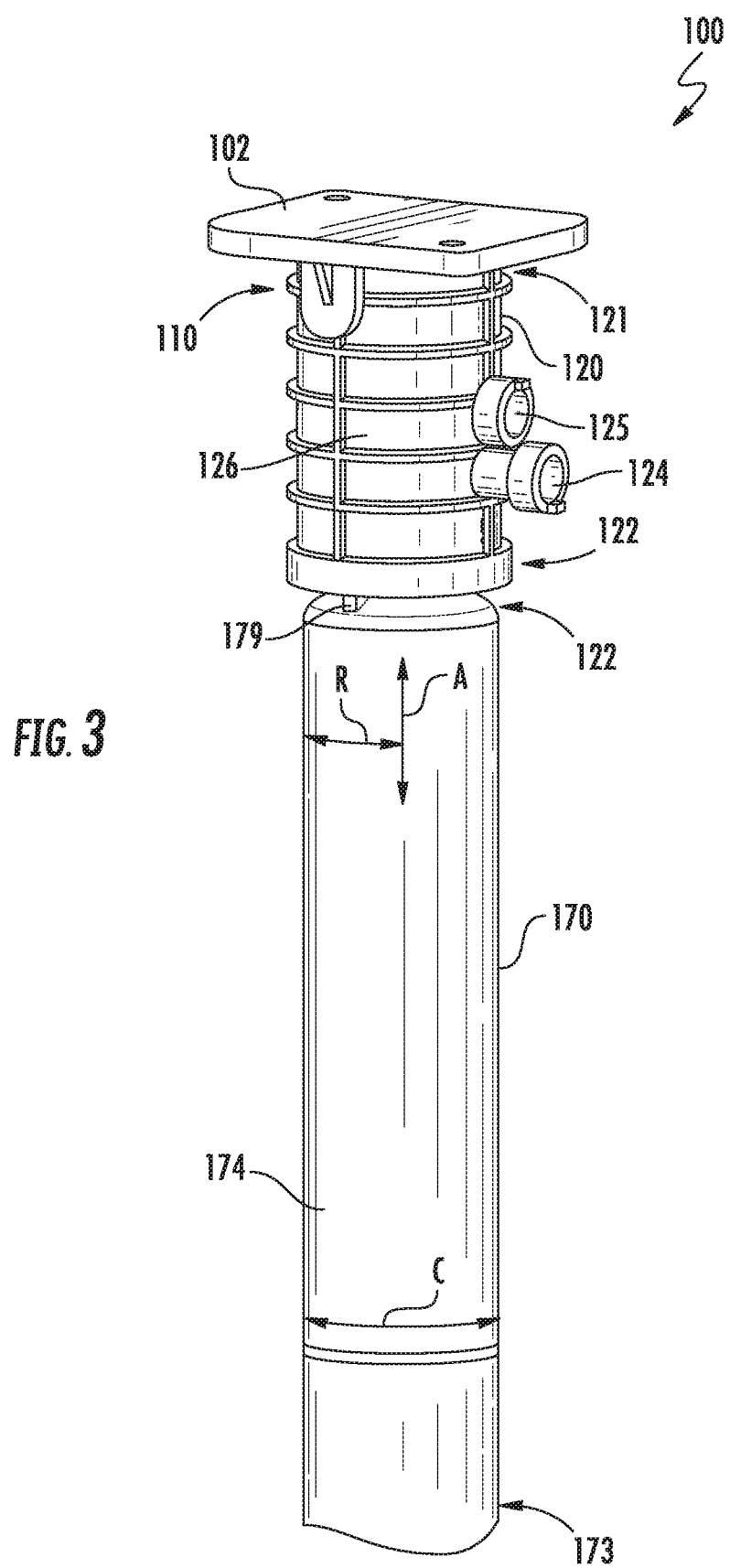
FIG. 3 is a perspective view of a filter assembly according to an example embodiment of the present subject matter.
Figure 4:
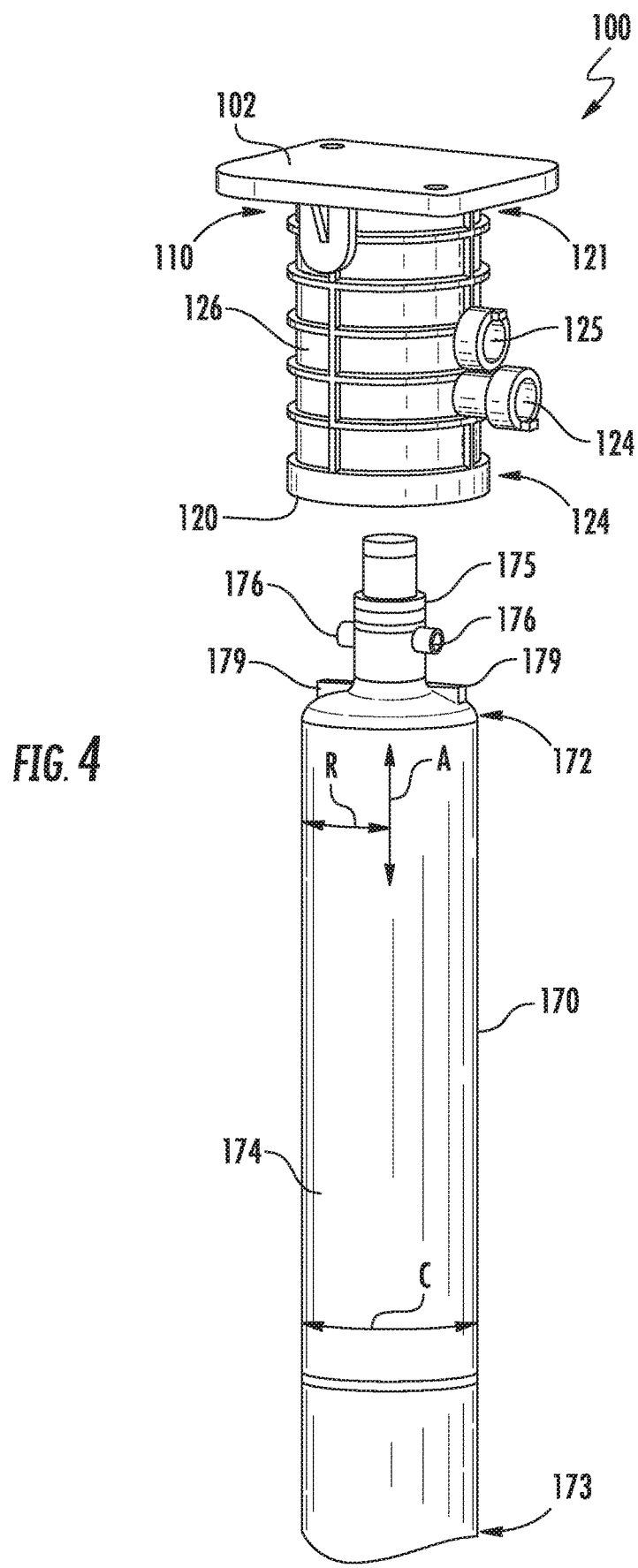
FIG. 4 is a perspective view of the example filter assembly of FIG. 3 with a filter cartridge of the example filter assembly shown removed from a manifold of the example filter assembly.
Figure 5:
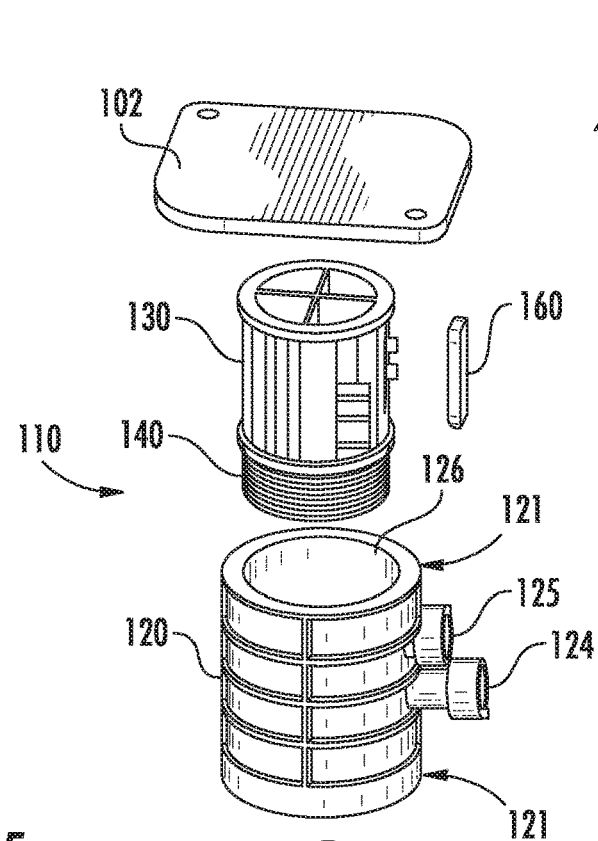
FIG. 5 is an exploded view of the example filter assembly of FIG. 3.
Figure 5:
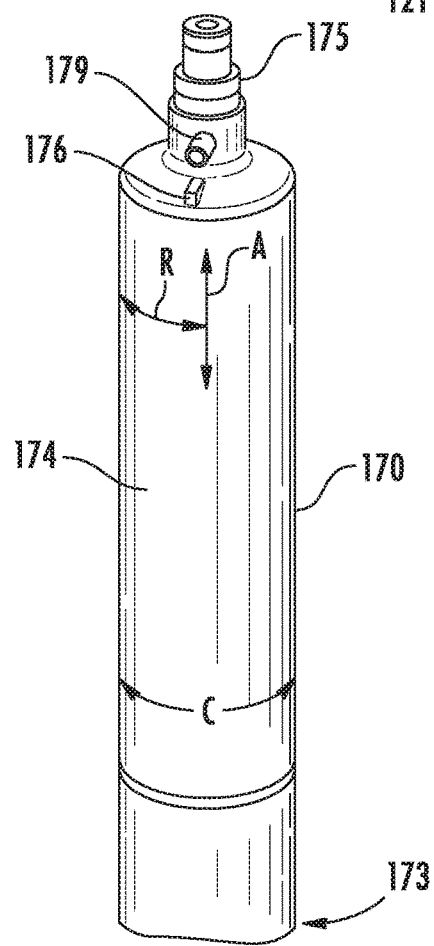

FIG. 3 is a perspective view of a filter assembly 100 according to an example embodiment of the present subject matter. FIG. 4 is a perspective view of filter assembly 100 with a filter cartridge 170 of filter assembly 100 shown removed from a manifold 110 of filter assembly 100. FIG. 5 is an exploded view of filter assembly 100. As an example, filter assembly 100 may be utilized in refrigerator appliance 10 as filter assembly 60. Thus, filter assembly 100 is described in greater detail below in the context of refrigerator appliance 10. In alternative exemplary embodiments, filter assembly 100 may be used in any other suitable appliance such as an ice maker, as a point of use water filtration system, e.g., installed beneath a sink, or as a point of entry water filtration system for an entire household. As discussed in greater detail below, filter assembly 100 includes features for assisting with changing filter cartridge 170, e.g., without water leaking from manifold 110. Filter assembly 100 defines an axial direction A and a radial direction R that are perpendicular to each other.

As may be seen in FIGS. 3 through 5 filter assembly 100 includes manifold 110 and filter cartridge 170. Filter cartridge 170 may be mounted to manifold 110 in order to filter water passing through manifold 110. As a filtering capacity of filter cartridge 170 decreases or at regular intervals, filter cartridge 170 may be changed in order to insure continuous, effective filtering of water flowing through filter assembly 100. In FIG. 3, filter cartridge 170 is shown mounted to manifold 110 while filter cartridge 170 is shown removed from manifold 110 in FIG. 4.

Figure 7:
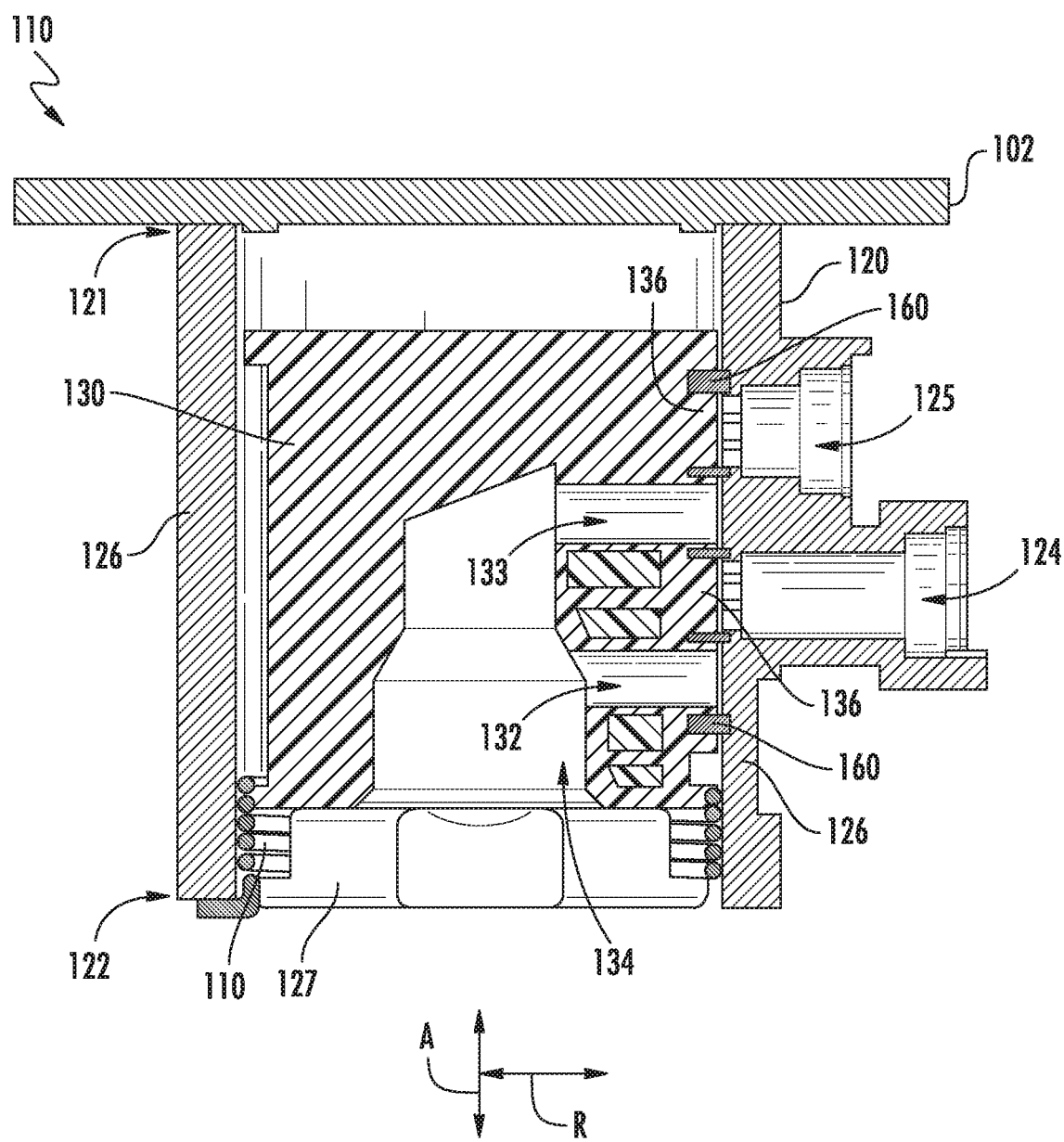
FIG. 7 is a section view of the manifold of FIG. 6.
Figure 8:
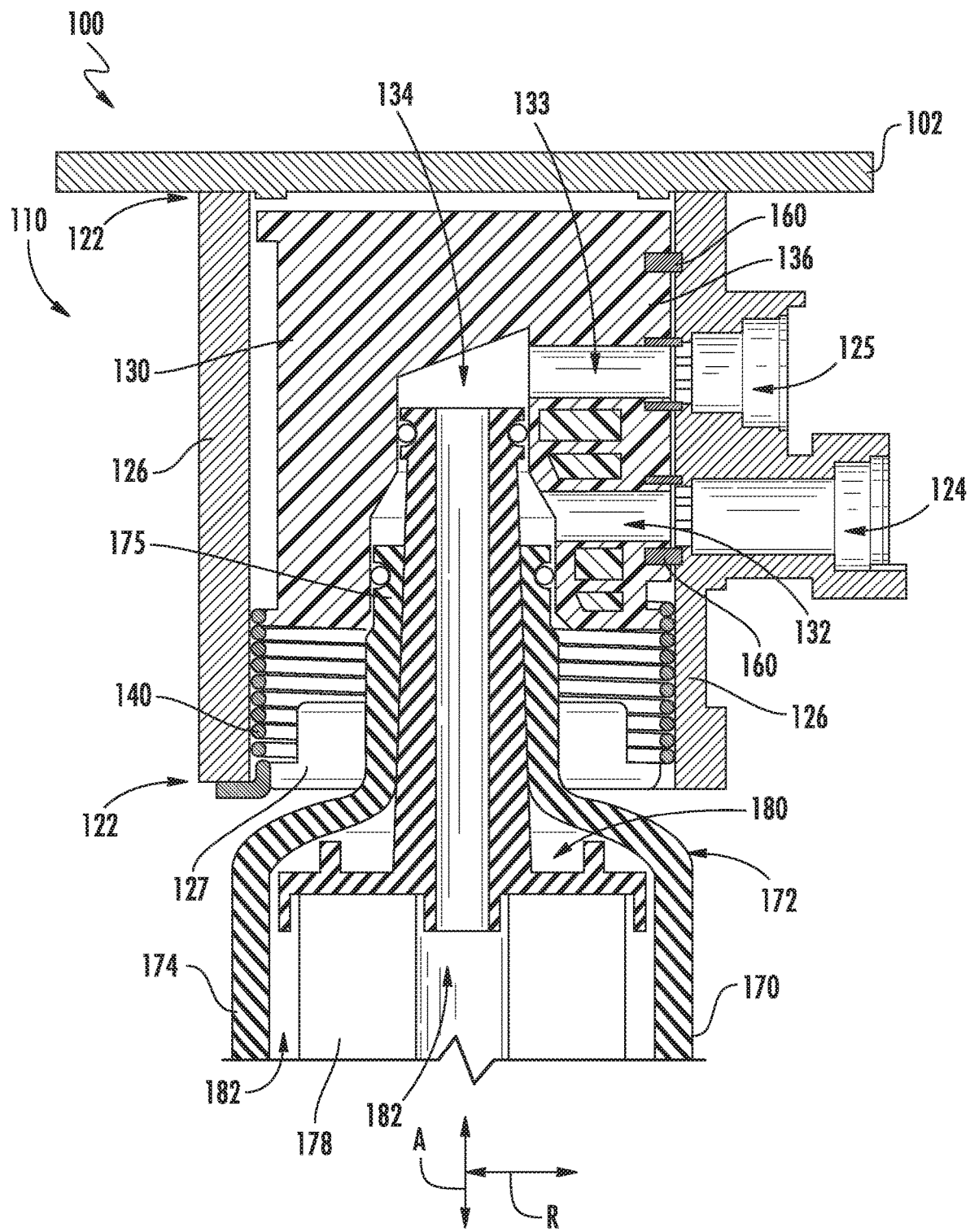
FIG. 8 is a partial, section view of the example filter assembly of FIG. 3.

As shown in FIG. 5, manifold 110 includes a housing 120 and a shuttle 130. Housing 120 and shuttle 130 cooperate to form a valve that opens when filter cartridge 170 is mounted to manifold 110 (FIG. 3) and closes when filter cartridge 170 is removed from manifold 110 (FIG. 4). Shuttle 130 is disposed within housing 120. FIG. 7 is a partial, section view of manifold 110 of filter assembly 100, and FIG. 8 is a partial, section view of filter assembly 100. As may be seen in FIGS. 7 and 8, shuttle 130 is movable relative to housing 120 between a plug position (FIG. 7) and a flow position (FIG. 8) along an axial direction A. In the plug position, shuttle 130 is positioned within housing 120 such that shuttle 130 blocks water flow through filter assembly 100 while shuttle 130 is positioned within housing 120 such that shuttle 130 permits water flow through filter assembly 100 in the flow positon.

Manifold 110 also includes a spring 140. Spring 140 is positioned within housing 120 and is connected to shuttle 130. Spring 140 urges shuttle 130 towards or into the plug position. Thus, shuttle 130 may be normally closed or in the plug position, e.g., such that shuttle 130 blocks water flow through filter assembly 100. In particular, when filter cartridge 170 is removed from manifold 110 (FIGS. 4 and 7), spring 140 urges shuttle 130 towards or into the plug position to block water flow through filter assembly 100. Conversely, filter cartridge 170 engages and positions shuttle 130 in the flow position when filter cartridge 170 is mounted or coupled to manifold 110 (FIGS. 3 and 8). Thus, a user may push filter cartridge 170 into manifold 110 and overcome the force applied by spring 140 in order to position shuttle 130 in the flow position and thereby permit water flow through filter assembly 100. In such a manner, shuttle 130 may shift from the plug positioned to the flow position when filter cartridge 170 is mounted or coupled to manifold 110.

As shown in FIGS. 7 and 8, spring 140 may be a tension spring, such as a coil spring or a leaf spring. Thus, e.g., spring 140 may be connected to and extend between support walls 127 and shuttle 130 such that spring 140 pulls shuttle 130 towards the plug positon. In alternate example embodiments, spring 140 may be a compression spring that is connected to and extends between bracket 102 and shuttle 130 such that spring 140 pushes shuttle 130 towards the plug positon.

Unfiltered water from manifold 110 may flow to filter cartridge 170, and filtered water may flow from filter cartridge 170 to manifold 110 when filter cartridge 170 is mounted to manifold 110 (FIG. 3) and shuttle 130 is in the flow position (FIG. 8). In particular, housing 120 has an inlet passage 124 and an outlet passage 125. Similarly, shuttle 130 has an inlet passage 132 and an outlet passage 133. Inlet passage 124 of housing 120 may be connected to a pressurized water supply, such as a municipal water supply or well, and outlet passage 125 may be direct filtered water out of filter assembly 100, e.g., to a faucet, water dispenser, ice maker, etc. Thus, components downstream of outlet passage 125 that are fluidly coupled to filter assembly 100 may receive filtered water from filter assembly 100. A bracket 102 may assist with coupling housing 120 to a wall of refrigerator appliance 10 or any other suitable structure. As an example, bracket 102 may be fastened to the wall with screws, nails, etc. that extend through bracket 102 into the wall.

Figure 12:
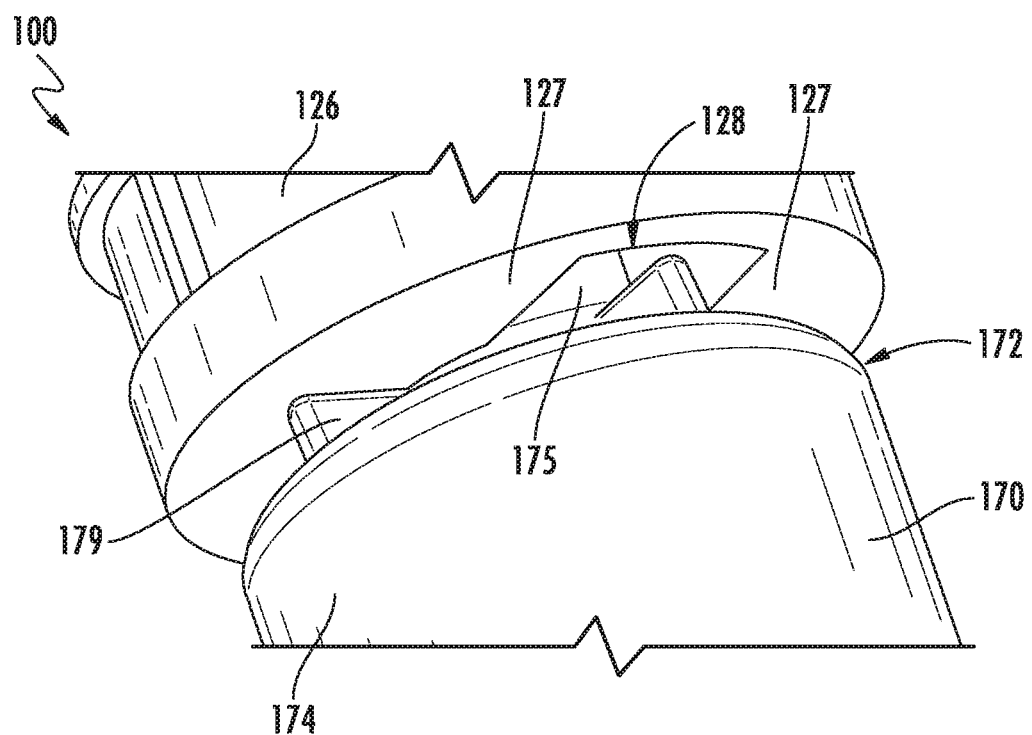
FIG. 12 is a partial, section view of the example filter assembly of FIG. 3.

Inlet passage 132 of shuttle 130 is contiguous or fluidly connected with inlet passage 124 of housing 120 in the flow position of shuttle 130. Thus, unfiltered water from the pressurized water supply may flow from inlet passage 124 of housing 120 into inlet passage 132 of shuttle 130 when shuttle 130 is in the flow position, as shown in FIG. 8. In addition, outlet passage 133 of shuttle 130 is contiguous or fluidly connected with outlet passage 125 of housing 120 in the flow position of shuttle 130. Thus, filtered water from filter cartridge 170 may flow from outlet passage 125 of housing 120 into outlet passage 133 of shuttle 130 when shuttle 130 is in the flow position, as shown in FIG. 12.

Inlet passage 132 of shuttle 130 is non-contiguous or not fluidly connected with inlet passage 124 of housing 120 in the plug position of shuttle 130. Thus, shuttle 130 may block unfiltered water from the pressurized water supply from flowing from inlet passage 124 of housing 120 into inlet passage 132 of shuttle 130 when shuttle 130 is in the plug position, as shown in FIG. 7. In addition, outlet passage 133 of shuttle 130 is non-contiguous or not fluidly connected with outlet passage 125 of housing 120 in the plug position of shuttle 130. Thus, shuttle 130 may block water flow between inlet passage 124 of housing 120 and inlet passage 132 of shuttle 130 when shuttle 130 is in the plug position, as shown in FIG. 7.

As shown in FIGS. 3 through 5, filter cartridge 170 includes a casing 174 that extends between a first end portion 172 and a second end portion 173, e.g., along the axial direction A. Casing 174 may be a cylindrical casing, e.g., such that casing 174 has a circular cross-section in a plane that is perpendicular to the axial direction A. However, a neck 175 of casing 174 with a tapering or narrowing cross-section may be positioned or formed at first end portion 172 of casing 174. Neck 175 of casing 174 is configured for engaging manifold 110. For example, neck 175 of casing 174 may be received within a socket 134 defined within shuttle 130 that is shaped complementary to neck 175. Filter cartridge 170 also includes a pair of lugs 176. Lugs 176 are positioned at first end portion 172 of casing 174, e.g., neck 175, and extend, e.g., along the radial direction R, from casing 174. Lugs 176 are spaced, e.g., along the circumferential direction C, on casing 174.

As shown in FIG. 8, a filter medium 178 is disposed within casing 174, e.g., within a chamber 180 defined by casing 174. Filter medium 178 divides chamber 180 into an unfiltered volume 182 and a filtered volume 184. As an example, unfiltered volume 182 may extend around filtered volume 184, and water may flow through filter medium 178 along the radial direction R from unfiltered volume 182 to filtered volume 184. Filter medium 178 removes impurities and contaminants from water passing through filter medium 178 from unfiltered volume 182 to filtered volume 184. Filter medium 178 may include any suitable mechanism for filtering water such as, e.g., ceramic filters, activated carbon filters, polymer filters, or reverse osmosis filters. In particular, filter medium 178 may be a hollow, cyclical block of activated carbon.

As used herein, the term "unfiltered" describes fluid that is not filtered relative to filter medium 178, and the term "filtered" describes fluid that is filtered relative to filter medium 178. Thus, the term "unfiltered volume" describes a volume within chamber 180 that is not filtered relative to filter medium 178, and the term "filtered volume" describes a volume within chamber 180 that is filtered relative to filter medium 178. However, as will be understood, filter assembly 100 (or an associated appliance, such as refrigerator appliance 10) may include additional filters that filter water entering chamber 180. Thus, "unfiltered volume" may be filtered relative to other filters but not filter medium 178.

Figure 6:
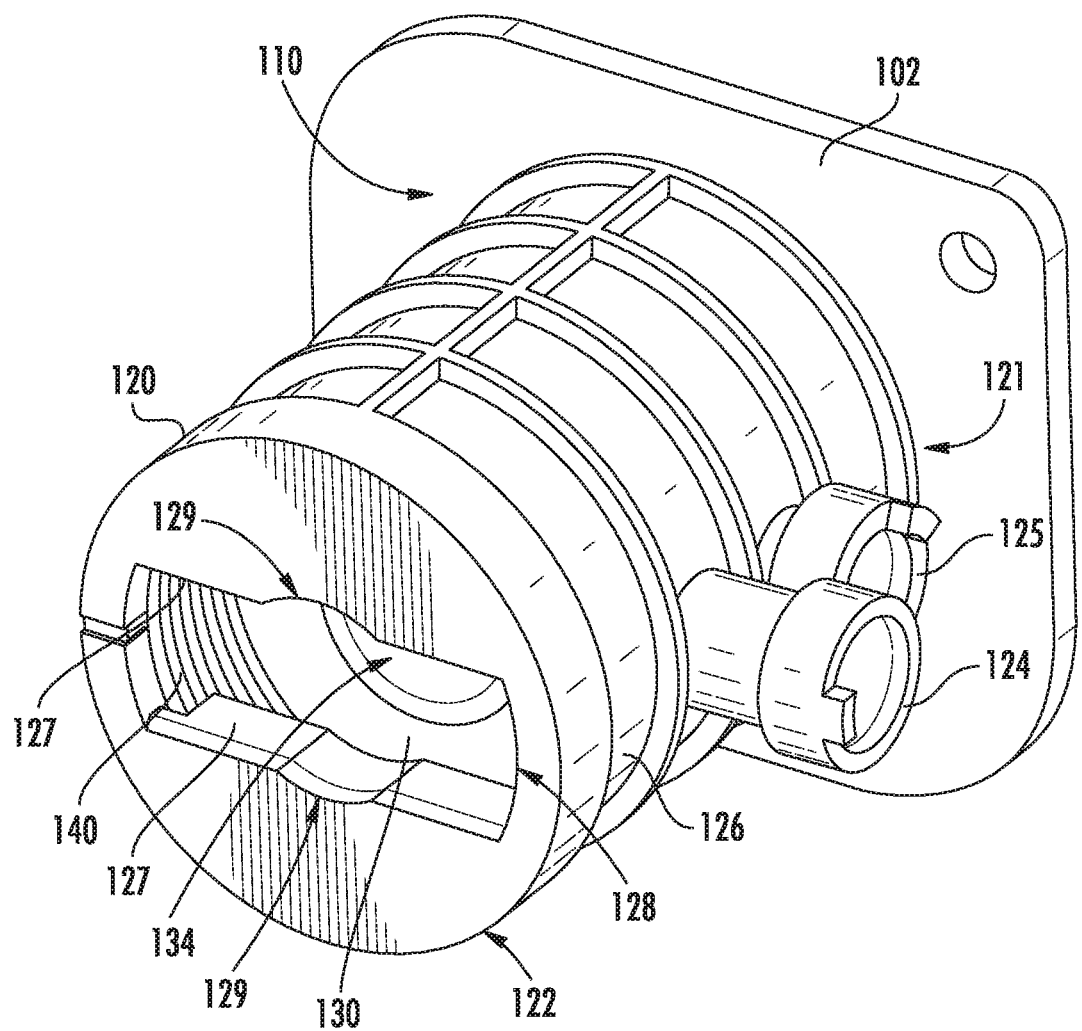
FIG. 6 is a bottom, perspective view of the manifold of the example filter assembly of FIG. 3.
Figure 11:
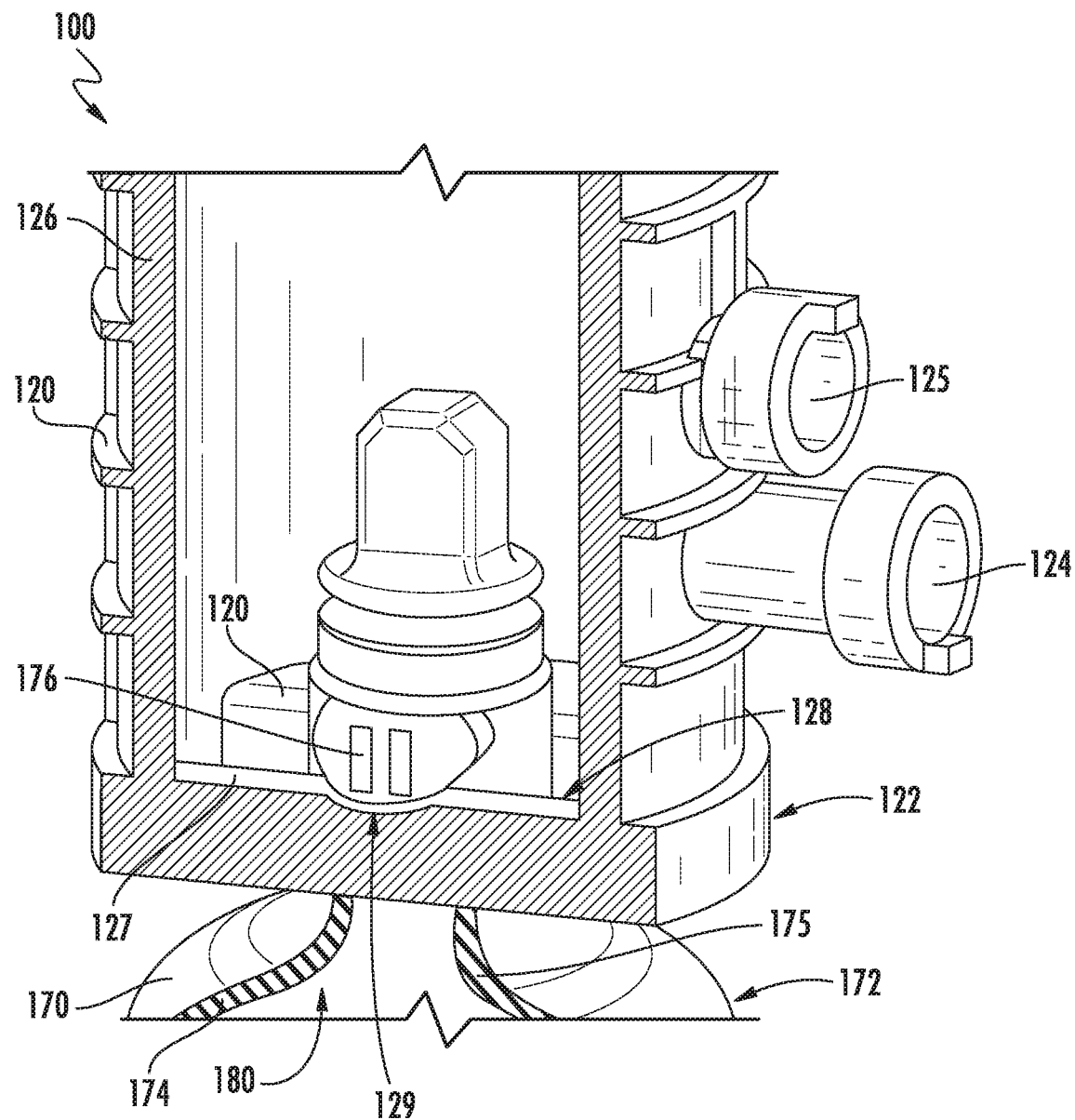
FIG. 11 is a partial, section view of the manifold of the example filter assembly of FIG. 3.

FIG. 6 is a bottom, perspective view of manifold 110. FIG. 11 is a partial, section view of filter assembly 100. As may be seen in FIGS. 6 and 11, housing 120 includes a cylindrical wall 126 that extends between a first end portion 121 and a second end portion 122, e.g., along the axial direction A. Thus, first and second end portions 121 and 122 of cylindrical wall 126 are spaced, e.g., along the axial direction A. Cylindrical wall 126 may be mounted, e.g., snap-fit, adhered, fastened, welded, etc., to bracket 102 at first end portion 121 of cylindrical wall 126. Housing 120 may also include a pair of support walls 127. Support walls 127 may be mounted to and/or formed with cylindrical wall 126 at second end portion 122 of cylindrical wall 126.

Figure 13:
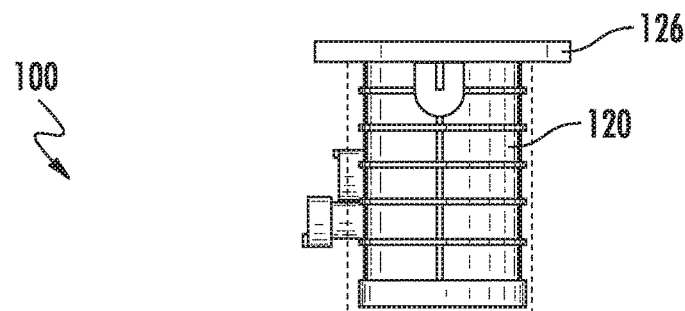
FIG. 13 is a partial, bottom perspective view of the example filter assembly of FIG. 3.
Figure 13:
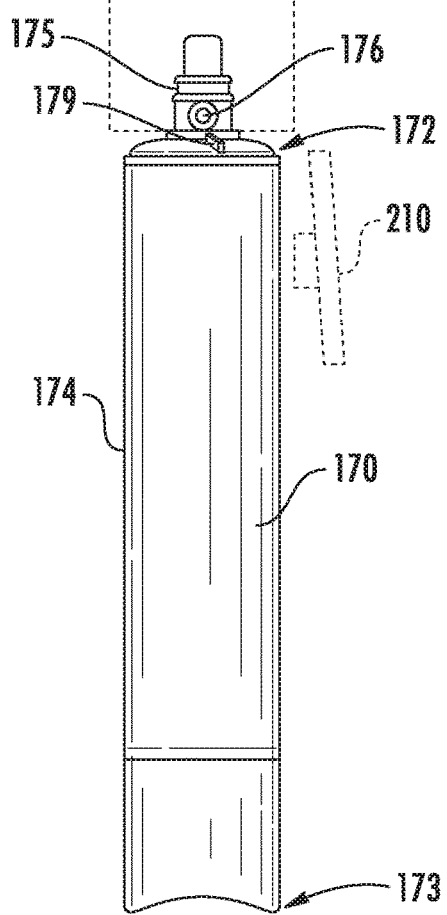

Support walls 127 may be spaced, and a slot 128 is defined between support walls 127. Slot 128 is sized for receiving lugs 176 of filter cartridge 170 during mounting of filter cartridge 170 to manifold 110. For example, lugs 176 may be aligned with slot 128 along a length of slot 128 such that a user may insert lugs 176 through slot 128. As shown in FIG. 13, stops 179 on casing 174, e.g., at or adjacent neck 175, may engage or impact housing 120 when neck 175 of filter cartridge 170 is properly inserted into housing 120 and/or shuttle 130 to prevent over insertion of neck 175 into housing 120, e.g., along the axial direction A.

Support walls 127 of housing 120 are positioned for supporting lugs 176 when filter cartridge 170 is coupled to manifold 110. For example, after a user inserts lugs 176 through slot 128, the user may rotate filter cartridge 170 such that lugs 176 are oriented transverse to the length of slot 128, as shown in FIG. 12. Thus, each lug 176 may rest on a respective one of support walls 127 when filter cartridge 170 is coupled to manifold 110. Support walls 127 and lugs 176 may cooperate to mount cartridge 170 to manifold 110. For example, support walls 127 and lugs 176 may interfere to prevent displacement of filter cartridge 170 away from manifold 110 along the axial direction A. Thus, support walls 127 and lugs 176 may hold filter cartridge 170 in connection with manifold 110. Each support walls 127 may define a dimple 129, and lugs 176 may be positioned within dimples 129 when filter cartridge 170 is coupled to manifold 110. In particular, lugs 176 may be pushed into dimples 129 when filter cartridge 170 is coupled to manifold 110. Dimples 129 may limit or prevent unintentional rotation of filter cartridge 170 relative to manifold 110. Thus, dimples 129 may assist with securely mounting filter cartridge 170 to manifold 110.

Figure 9:
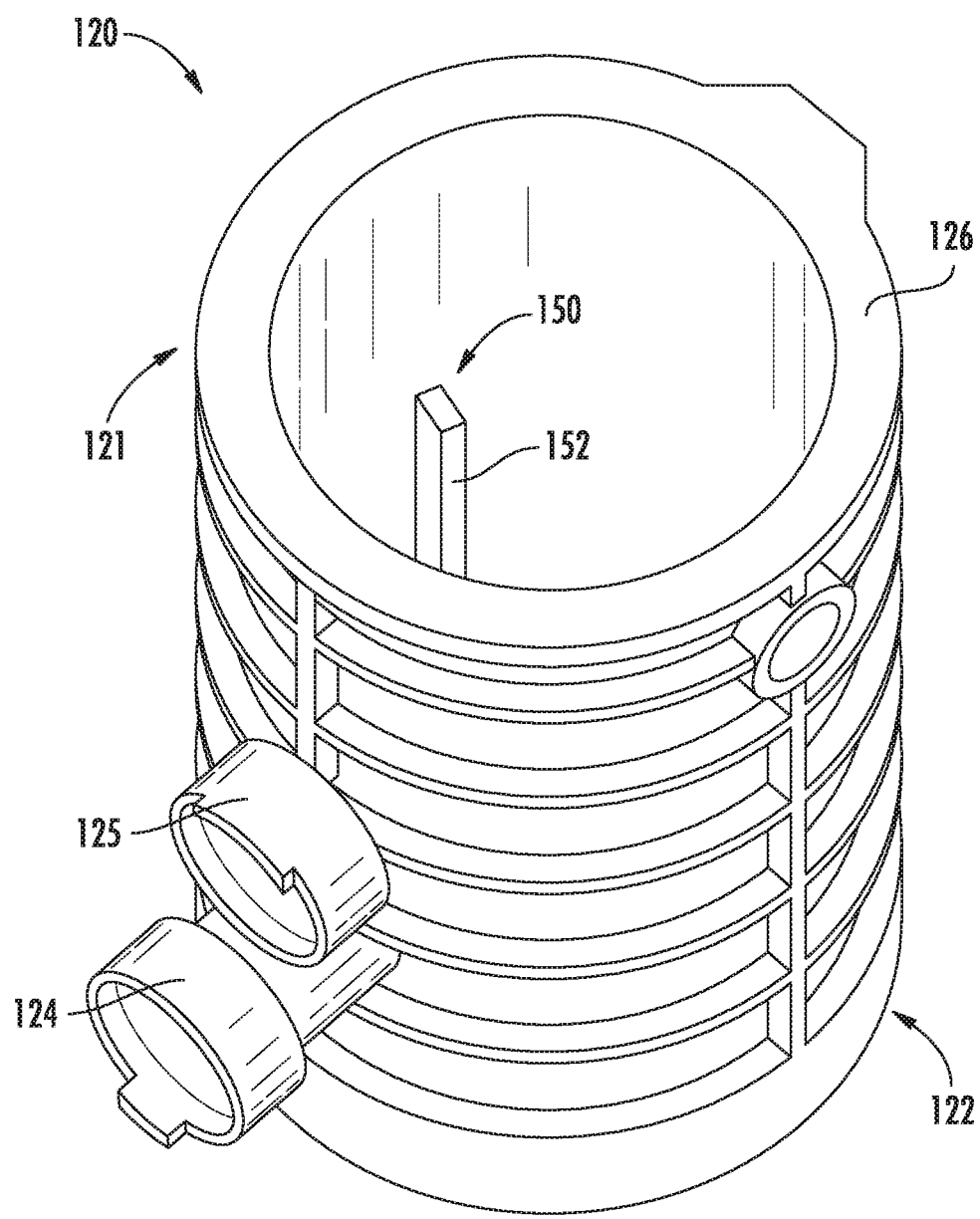
FIG. 9 is a top, perspective view of a housing of the manifold of FIG. 6.
Figure 10:
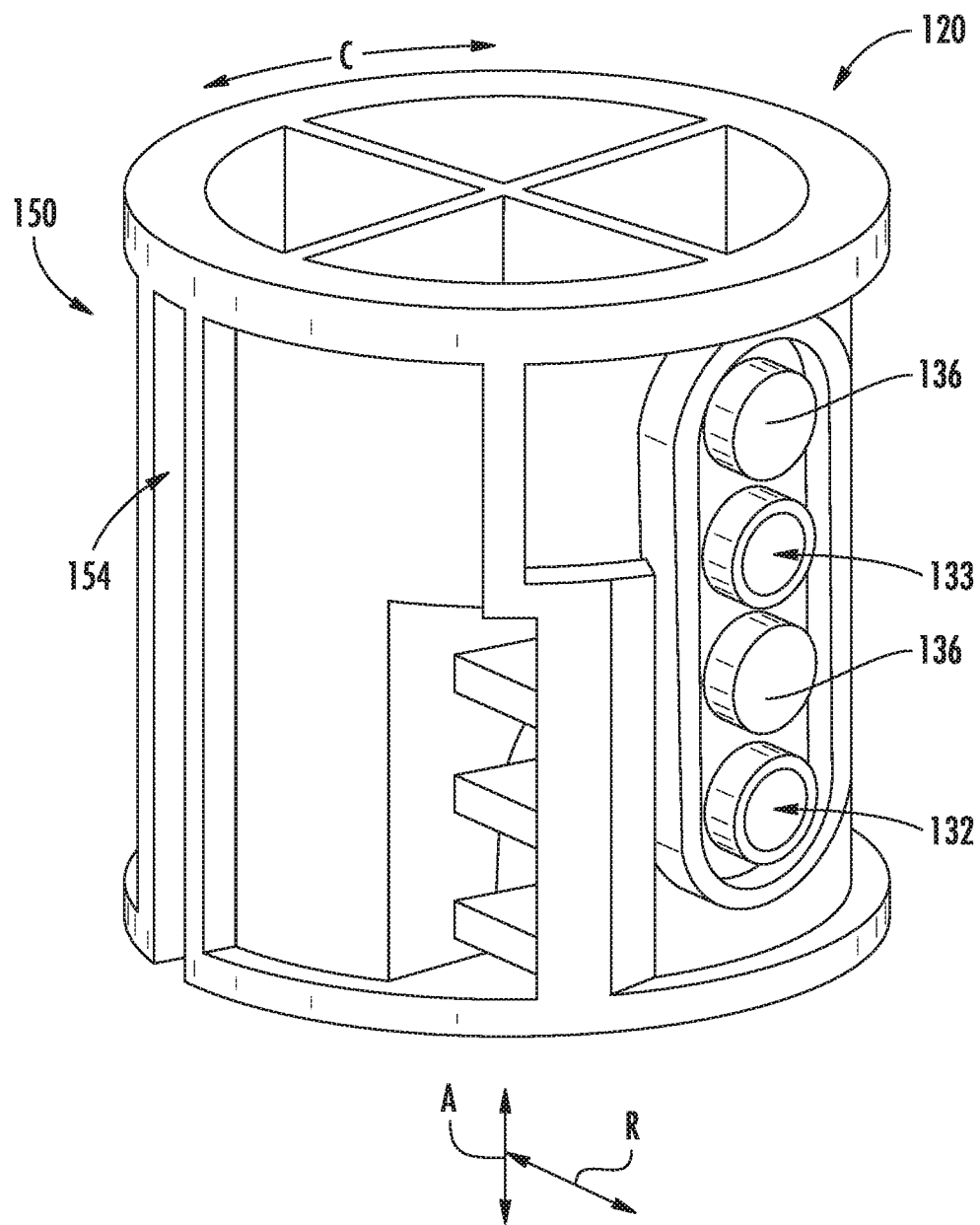
FIG. 10 is a perspective view of a shuttle of the manifold of FIG. 6.

Shuttle 130 is coupled to housing 120 such that shuttle 130 is non-rotatable relative to housing 120 about the axial direction A. It will be understood that the some small "play" between shuttle 130 and housing 120 may be permit negligible rotation of shuttle 130 relative to housing 120. Thus, as used herein, the term "non-rotatable" means couplings between shuttle 130 and housing 120 that permit no more than five degrees relative rotation between shuttle 130 and housing 120. Shuttle 130 may be coupled to housing 120 in any suitable manner so that shuttle 130 is non-rotatable relative to housing 120. For example, as shown in FIG. 9, manifold 110 includes a guide assembly 150 that couples shuttle 130 to housing 120 such that shuttle 130 is non-rotatable relative to housing 120. Guide assembly 150 includes a slider 152, such as a rail, pin or projection, and a channel 154. Slider 152 is disposed and movable within channel 154, e.g., along the axial direction A. However, slider 152 may be sized to extend across a width of channel 154, e.g., along the circumferential direction C, in order limit or prevent rotation of shuttle 130 relative to housing 120. Slider 152 is mounted on or formed with one of housing 120 and shuttle 130, and channel 154 is positioned on or formed in the other of housing 120 and shuttle 130. For example, as shown in FIG. 9, slider 152 may positioned on housing 120 while channel 154 may be formed in shuttle 130, as shown in FIG. 10. It will be understood that the positioning of slider 152 and channel 154 on housing 120 and shuttle 130 may be reversed in alternative example embodiments.

As shown in FIG. 4, manifold 110 may also include a seal 160. Turning to FIGS. 7 and 8, seal 160 extends between housing 120 and shuttle 130, e.g., along the radial direction R. Thus, seal 160 may block water leaks through a radial gap between housing 120 and shuttle 130. Seal 160 may be mounted to shuttle 130, and seal 160 may extend around both inlet and outlet passages 132, 133 of shuttle 130. Thus, a single seal 160 may limit water leaks from both inlet and outlet passages 132, 133 of shuttle 130. As shown in FIG. 10, shuttle 130 may include a pair of plugs 136. Plugs 136 may be aligned with inlet and outlet passages 132, 133 of shuttle 130, e.g., along the axial direction A. Thus, plugs 136 may be positioned collinear with inlet and outlet passages 132, 133 of shuttle 130, e.g., along the axial direction A. Seal 160 may define four holes with each positioned at a respective one of inlet passage 132 of shuttle 130, outlet passage 133 of shuttle 130, and plugs 136. As shown in FIG. 8, each plug 136 is aligned, e.g., along the radial direction R, with one of inlet and outlet passages 132, 133 of shuttle 130 when shuttle 130 is in the plug positon. Plugs 136 may cooperate with seal 160 to limit or prevent fluid flow out of manifold 110 when filter cartridge 170 is removed from manifold 110 and shuttle 130 is in the plug positon. Conversely, as shown in FIG. 7, plugs 136 are unaligned, e.g., along the radial direction R, with inlet and outlet passages 132, 133 of shuttle 130 when shuttle 130 is in the flow positon. Thus, water may flow between manifold 110 and filter cartridge 170 in the manner described above without being blocked by plugs 136 when filter cartridge 170 is mounted to manifold 110 and shuttle 130 is in the flow positon.

Figure 14:
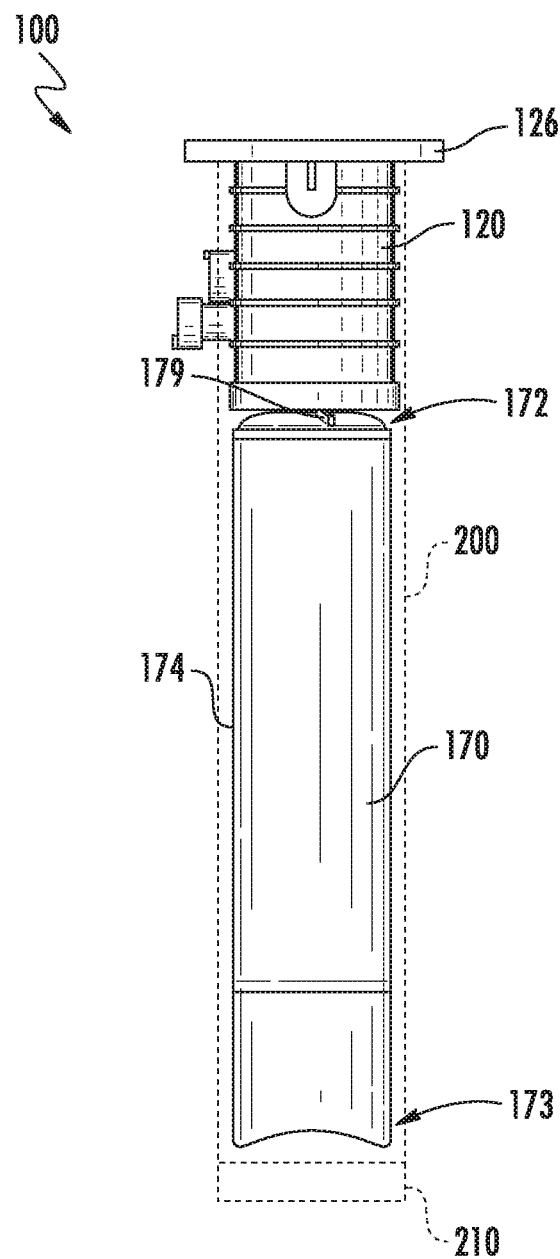
FIG. 14 is a perspective view of a filter assembly according to another example embodiment of the present subject matter.

FIGS. 13 and 14 are elevation views of filter assembly 100 according to another example embodiment of the present subject matter. In FIGS. 13 and 14, filter assembly 100 includes common components as described above for FIGS. 3 through 13. However, filter cartridge 170 is mounted to manifold 110 without requiring rotation of filter cartridge 170 relative to manifold 110 and engagement of lugs 176 with housing 120 in FIGS. 13 and 14. In particular, filter assembly 100 includes a filter cartridge sleeve 200 mounted to housing 120. Filter cartridge sleeve 200 is configured (e.g., shaped and oriented) for receiving filter cartridge 170. Thus, e.g., filter cartridge sleeve 200 may be shaped and oriented such that filter cartridge 170 is selectively positionable within filter cartridge sleeve 200. Filter cartridge sleeve 200 includes a door 210. In FIG. 13, door 210 is shown in an open position while door 210 is shown in a closed position in FIG. 14. When door 210 is in the closed position, filter cartridge 170 is coupled with manifold 110 such that shuttle 130 is positioned at the flow position. In particular, door 210 of filter cartridge sleeve 200 may engage second end portion 173 of casing 174 when door 210 is in the closed position such that door 210 holds filter cartridge 170 against manifold 110 and thereby positions shuttle 130 at the flow position by holding filter cartridge 170 against the force of spring 140. Thus, when a user inserts filter cartridge 170 into filter cartridge sleeve 200 and closes door 210, door 210 holds filter cartridge 170 against manifold 110 to allow fluid flow between filter cartridge 170 against manifold 110 in the manner described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter manifold, comprising:
   a housing having an inlet passage and an outlet passage;
   a shuttle disposed within the housing such that the shuttle is movable relative to the housing between a plug position and a flow position along an axial direction, the shuttle having an inlet passage and an outlet passage, the inlet passage of the shuttle contiguous with the inlet passage of the housing in the flow position of the shuttle, the outlet passage of the shuttle contiguous with the outlet passage of the housing in the flow position of the shuttle, the inlet passage of the shuttle non-contiguous with the inlet passage of the housing in the plug position of the shuttle, the outlet passage of the shuttle non-contiguous with the outlet passage of the housing in the plug position of the shuttle, the shuttle coupled to the housing such that the shuttle is non-rotatable relative to the housing about the axial direction;

a seal extending between the housing and the shuttle, the seal mounted to the shuttle and extending around both the inlet passage and outlet passage of the shuttle;

a spring disposed within the housing, the spring connected to the shuttle such that the spring urges the shuttle towards the plug position; and a filter cartridge sleeve mounted to the housing, the filter cartridge sleeve configured for receiving a filter cartridge, the filter cartridge sleeve having a door, wherein, when the door is in a closed position, the filter cartridge couples with the filter manifold such that the shuttle is positioned at the flow position of the shuttle.

2. The filter manifold of claim 1, wherein the shuttle comprises a pair of plugs, the pair of plugs aligned with the inlet passage and outlet passage of the shuttle, the seal defining four holes, each hole of the four holes positioned at a respective one of the inlet passage of the shuttle, the outlet passage of the shuttle, and the pair of plugs.

3. The filter manifold of claim 1, wherein the spring is a compression spring, the shuttle positioned between a pair of support walls of the housing and the compression spring within the housing.

4. The filter manifold of claim 1, wherein the spring is a tension spring, the tension spring connected to and extending between at least one of a pair of support walls and the shuttle.

5. The filter manifold of claim 1, wherein the door of the filter cartridge sleeve engages an end of the filter cartridge when the door is in the closed position such that the door holds the filter cartridge such that the shuttle is positioned at the flow position of the shuttle by the filter cartridge against the spring.

6. A filter assembly, comprising:
a filter cartridge; and
a filter manifold comprising
a housing having an inlet passage and an outlet passage;
a shuttle disposed within the housing such that the shuttle is movable relative to the housing between a plug position and a flow position along an axial direction, the shuttle having an inlet passage and an outlet passage, the inlet passage of the shuttle contiguous with the inlet passage of the housing in the flow position of the shuttle, the outlet passage of the shuttle contiguous with the outlet passage of the housing in the flow position of the shuttle, the inlet passage of the shuttle non-contiguous with the inlet passage of the housing in the plug position of the shuttle, the outlet passage of the shuttle non-contiguous with the outlet passage of the housing in the plug position of the shuttle, the shuttle coupled to the housing such that the shuttle is non-rotatable relative to the housing about the axial direction;

a seal extending between the housing and the shuttle, the seal mounted to the shuttle and extending around both the inlet passage and outlet passage of the shuttle;

a spring disposed within the housing, the spring connected to the shuttle such that the spring urges the shuttle towards the plug position; and a filter cartridge sleeve mounted to the housing, the filter cartridge sleeve configured for receiving the filter cartridge, the filter cartridge sleeve having a door, wherein, when the door is in a closed position, the filter cartridge couples with the filter manifold such that the shuttle is positioned at the flow position of the shuttle.

7. The filter assembly of claim 6, wherein the shuttle comprises a pair of plugs, the pair of plugs aligned with the inlet passage and outlet passage of the shuttle, the seal defining four holes, each hole of the four holes positioned at a respective one of the inlet passage of the shuttle, the outlet passage of the shuttle, and the pair of plugs.

8. The filter assembly of claim 6, wherein the spring is a tension spring, the tension spring connected to and extending between at least one of a pair of support walls and the shuttle.

9. The filter assembly of claim 6, wherein the door of the filter cartridge sleeve engages an end of the filter cartridge when the door is in the closed position such that the door holds the filter cartridge such that the shuttle is positioned at the flow position of the shuttle by the filter cartridge against the spring.

10. A filter manifold, comprising:
a housing having an inlet passage and an outlet passage, the housing defining a slot between a pair of support walls of the housing;
a shuttle disposed within the housing such that the shuttle is movable relative to the housing between a plug position and a flow position along an axial direction, the shuttle having an inlet passage and an outlet passage, the inlet passage of the shuttle contiguous with the inlet passage of the housing in the flow position of the shuttle, the outlet passage of the shuttle contiguous with the outlet passage of the housing in the flow position of the shuttle, the inlet passage of the shuttle non-contiguous with the inlet passage of the housing in the plug position of the shuttle, the outlet passage of the shuttle non-contiguous with the outlet passage of the housing in the plug position of the shuttle, the shuttle coupled to the housing such that the shuttle is non-rotatable relative to the housing about the axial direction;

a seal extending between the housing and the shuttle, the seal mounted to the shuttle and extending around both the inlet passage and outlet passage of the shuttle; and a tension spring disposed within the housing, the tension spring connected to the shuttle such that the tension spring urges the shuttle towards the plug position, wherein, the shuttle is positioned at the flow position of the shuttle when a filter cartridge is coupled to the filter manifold, the slot of the housing sized for receiving a pair of lugs of the filter cartridge during mounting of the filter cartridge to the filter manifold, the pair of support walls of the housing positioned for supporting the pair of lugs of the filter cartridge when the filter cartridge is coupled to the filter manifold.

11. The filter manifold of claim 10, wherein the shuttle comprises a pair of plugs, the pair of plugs aligned with the inlet passage and outlet passage of the shuttle, the seal defining four holes, each hole of the four holes positioned at a respective one of the inlet passage of the shuttle, the outlet passage of the shuttle, and the pair of plugs.

12. The filter manifold of claim 10, wherein the pair of support walls each define a dimple, the dimples of the pair of support walls of the housing positioned for receiving the pair of lugs of the filter cartridge when the filter cartridge is coupled to the filter manifold.

13. The filter manifold of claim 10, wherein the tension spring is connected to and extends between at least one of the pair of support walls and the shuttle.

14. A filter assembly, comprising:
a filter cartridge having a pair of lugs; and
a filter manifold comprising
   a housing having an inlet passage and an outlet passage, the housing defining a slot between a pair of support walls of the housing;
   a shuttle disposed within the housing such that the shuttle is movable relative to the housing between a plug position and a flow position along an axial direction, the shuttle having an inlet passage and an outlet passage, the inlet passage of the shuttle contiguous with the inlet passage of the housing in the flow position of the shuttle, the outlet passage of the shuttle contiguous with the outlet passage of the housing in the flow position of the shuttle, the inlet passage of the shuttle non-contiguous with the inlet passage of the housing in the plug position of the shuttle, the outlet passage of the shuttle non-contiguous with the outlet passage of the housing in the plug position of the shuttle, the shuttle coupled to the housing such that the shuttle is non-rotatable relative to the housing about the axial direction;
   a seal extending between the housing and the shuttle, the seal mounted to the shuttle and extending around both the inlet passage and outlet passage of the shuttle; and
   a tension spring disposed within the housing, the tension spring connected to the shuttle such that the tension spring urges the shuttle towards the plug position,
   wherein, the shuttle is positioned at the flow position of the shuttle when the filter cartridge is coupled to the filter manifold, the slot of the housing sized for receiving the pair of lugs of the filter cartridge during mounting of the filter cartridge to the filter manifold, the pair of support walls of the housing positioned for supporting the pair of lugs of the filter cartridge when the filter cartridge is coupled to the filter manifold.

15. The filter manifold of claim 12, wherein the shuttle comprises a pair of plugs, the pair of plugs aligned with the inlet passage and outlet passage of the shuttle, the seal defining four holes, each hole of the four holes positioned at a respective one of the inlet passage of the shuttle, the outlet passage of the shuttle, and the pair of plugs.

16. The filter manifold of claim 12, wherein the pair of support walls each define a dimple, the dimples of the pair of support walls of the housing positioned for receiving the pair of lugs of the filter cartridge when the filter cartridge is coupled to the filter manifold.

* * * * *